(12) United States Patent
Iwanaga (10) Patent No.: US 6,400,402 B1
(45) Date of Patent: Jun. 4, 2002

(54) HIGHLY PRECISE IMAGE PICKUP APPARATUS WITH APERTURES OFFSET FROM A LENTER

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 08/897,119

(22) Filed: Jul. 18, 1997

(30) Foreign Application Priority Data

Jul. 22, 1996 (JP) .............................................. 8-209382

(51) Int. Cl.[7] .............................................. H04N 5/225
(52) U.S. Cl. ........................ 348/219; 348/340; 348/362
(58) Field of Search ................................. 348/219, 272, 348/273, 275, 218, 220, 222, 340, 335, 362, 363, 367; H04N 5/225

(56) References Cited

U.S. PATENT DOCUMENTS

| | | | | |
|---|---|---|---|---|
| 4,383,170 A | * | 5/1983 | Takagi et al. | 348/219 |
| 4,652,928 A | * | 3/1987 | Endo et al. | 358/213 |
| 4,998,164 A | * | 3/1991 | Endo et al. | 358/44 |
| 5,708,263 A | * | 1/1998 | Wong | 250/208.1 |
| 5,877,806 A | * | 3/1999 | Kawano | 348/219 |
| 6,031,569 A | * | 2/2000 | Nobuoka et al. | 348/219 |

FOREIGN PATENT DOCUMENTS

| | | | | |
|---|---|---|---|---|
| GB | 2270230 A | * | 3/1994 | ............ H04N/3/10 |
| JP | 07-015732 | | 1/1995 | |

* cited by examiner

Primary Examiner—Tuan Ho
(74) Attorney, Agent, or Firm—Frishauf, Holtz, Goodman, Langer & Chick, P.C.

(57) ABSTRACT

An imaged pickup apparatus wherein the light projected position in which light representing sample points of the image of an object to be photographed is projected is changed, and any light receiving element of a light receiving section sequentially detects the intensity of the light representing the individual sample points. The light receiving section generates outputs representing the detected light intensities in synchronization with changes of the light projected position, and as a result, a plurality of image signals are produced. The light receiving section includes a plurality of groups each of which consists of light receiving elements, having light receiving surfaces and forming a set, and apertures. The apertures are orthographically projected in different positions on the light receiving surfaces of the light receiving elements. The produced pixel data are arranged so that the pixel data representing the intensity of light which has passed through different apertures are adjacent to each other. The individual pixel data are treated as those obtained under the condition wherein the apertures are apparently moved to predetermined positions on the light receiving surfaces.

19 Claims, 9 Drawing Sheets

HIGHLY PRECISE IMAGE PICKUP APPARATUS WITH APERTURES OFFSET FROM A LENTER

BACKGROUND OF THE INVENTION

A conventional image pickup apparatus includes a light receiving section such as a CCD (Charge Coupled Device) which has light receiving elements arranged in a matrix pattern. The light receiving section detects, as a large number of sample points, the object to be photographed or the image to be picked up. Output signals representing the individual sample points as detected form an image signal. Therefore, the resolution when the image is picked up is determined by the number of light receiving elements. Normally, in the case where the number of light receiving elements is increased, the cost of the CCD rises even though the integration density of the light receiving section is not increased. In order to improve the integration density without a change in the size of the area occupied by the light receiving section or the CCD, it is necessary to improve the manufacturing accuracy. This results in the cost of the CCD further rising.

A method proposed as means for solving the above will now be described. According to this method, the positions of the sample points with respect to the light receiving section are mechanically or optically changed in sequence. The sample points are detected by any one of the light receiving elements. The output signals corresponding to the detected sample points are output in synchronization with changes of the positions of the sample points, and as a result, a plurality of image signals are produced. In this method, the integration density need not be increased.

In the above method, the structure by which the light receiving section is moved lengthwise or widthwise may be used as means for mechanically moving the sample points. The structure by which the tilt angle, tilt direction, thickness, etc. of a light refracting element are changed may be used as means for optically moving the sample points.

The output signals serving the image signals and representing the sample points moved and detected by any one of the light receiving elements are subjected to the interpolation. The interpolation is the processing by which pixel data in the individual image signals produced in sequence are arranged at the middle portions of the light receiving elements of the CCD. Final pixel arrangement data is attained through the interpolation.

FIGS. 1A to 1D are diagrams showing examples of the interpolation for attaining the final pixel arrangement data.

Figure 1A:
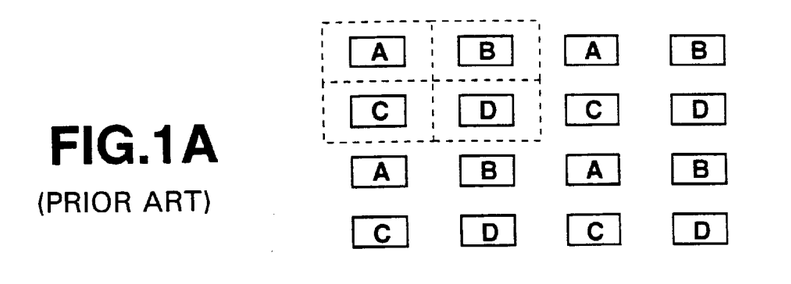
FIG. 1A is a diagram showing the positional relationship between apertures A to D arranged in front of four light receiving elements forming a set.

In FIGS. 1A to 1D, color filters mounted on black masks are provided in front of the light receiving elements of the light receiving section. Each black mask is provided with apertures. Each aperture is formed so that the light passing therethrough is projected on the general center of its corresponding light receiving element. As shown in FIG. 1A, the light receiving section includes four apertures A, B, C and D which are arranged in 2×2 matrix pattern. The apertures are in one-to-one correspondence with the light receiving elements. There is an interval equal to the length or width of 1 aperture between the apertures of each laterally or vertically adjacent pair among the apertures A to D.

Each light receiving element sequentially detects four sample points from the object to be photographed, and the interpolation is performed with respect to the image obtained as that of the object. For easy understanding, let it be assumed in the following explanation that the apertures located above the light receiving elements are moved.

Figure 1B:
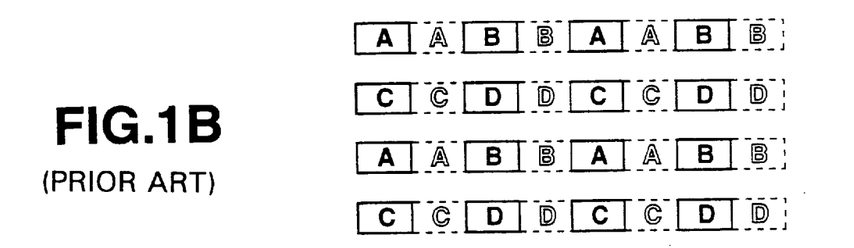
FIG. 1B is a diagram showing the positional relationship between the apertures after moved 0.5 element pitch to the right.

First, as shown in FIG. 1B, the apertures A to D corresponding to the light receiving elements are moved 0.5 element pitch to the right. As a result, the aperture A is located adjacent to and on the right-hand side of its initial position. The aperture B is located adjacent to and on the right-hand side of its initial position. The aperture C is located adjacent to and on the right-hand side of its initial position. The aperture D is located adjacent to and on the right-hand side of its initial position.

Figure 1C:
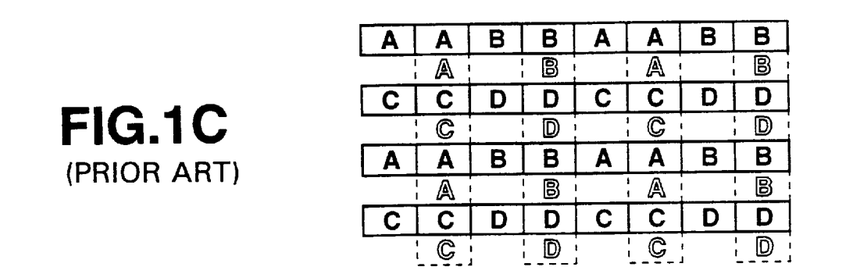
FIG. 1C is a diagram showing the positional relationship between the apertures after further moved 0.5 element pitch downward.

Thereafter, as shown in FIG. 1C, the apertures A to D are moved 0.5 element pitch downward. In consequence, the, aperture A is located directly under the position which the aperture A has reached as a result of the previous movement. The aperture B is located directly under the position which the aperture B has reached as a result of the previous movement. The aperture C is located directly under the position which the aperture C has reached as a result of the previous movement. The aperture D is located directly under the position which the aperture D has reached as a result of the previous movement.

Figure 1D:
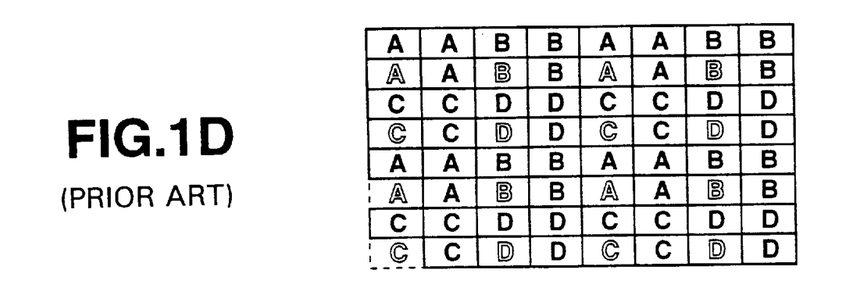
FIG. 1D is a diagram showing the positional relationship between the apertures after further moved 0.5 element pitch to the left.

Thereafter, as shown in FIG. 1D, the apertures A to D are further moved 0.5 element pitch to the left. Consequently, the aperture A is located adjacent to and on the left-hand side of the position which the aperture A has reached as a result of the previous movement. The aperture B is located adjacent to and on the left-hand side of the position which the aperture B has reached as a result of the previous movement. The aperture C is located adjacent to and on the left-hand side of the position which the aperture C has reached as a result of the previous movement. The aperture D is located adjacent to and on the left-hand side of the position which the aperture D has reached as a result of the previous movement.

FIG. 1D shows the final pixel arrangement data attained in the above-described manner. In the final pixel arrangement data, the pixel data representing the light which has passed through the same aperture are arranged adjacent to each other. Specifically, of the pixel data, four pixel data items representing the light which has passed through the aperture A are arranged adjacent to each other, and four pixel data items representing the light which has passed through the aperture B are arranged adjacent to each other and on the right-hand side of the group formed of the pixel data items representing the light which has passed through the aperture A. Four pixel data items representing the light which has passed through the aperture C are arranged adjacent to each other and under the group formed of the pixel data items representing the light which has passed through the aperture A. Four pixel data items representing..the light which has passed through the aperture D are arranged adjacent to each other and under the group formed of the pixel data items representing the light which has passed through the aperture B. By processing the final pixel arrangement data described above, a luminance signal Y and color difference signals R−Y and B−Y are attained. The signals Y, R−Y and B−Y are reproduced as the final pixel arrangement data having the pixel arrangement shown in FIG. 1 D, whereby the picked-up image is reproduced. With this method, the resolution is improved without a change in the integration density of the light receiving elements.

However, according to the above method, as shown in FIG. 1D, the pixel data representing the light which has passed through the same aperture are adjacent to each other in the final pixel arrangement data. In that case, four kinds of pixel data representing the light which has passed through the apertures form groups according to the respective kinds. Under this condition, the resolution when a group of adjacent pixel data corresponding to the same color is regarded as a single pixel data item is not improved. Consequently, the data precision of the chrominance signal Y and the color difference signals R–Y and B–Y is low, and the horizontal and vertical resolutions are not satisfactorily improved. This prevents a conventional image pickup apparatus from having satisfactorily high performance.

SUMMARY OF THE INVENTION

According to one preferred embodiment of the present invention, there is provided an image pickup apparatus comprising:

a light receiving section having a plurality of groups each consisting of apertures and light receiving elements for receiving light coming from sample points on an object to be photographed and for outputting a signal representing the light, said apertures being orthographically projected in different positions on light receiving surfaces of said light receiving elements;

sample point changing means for changing a position in which the light coming from the sample points is projected on the light receiving surfaces of said light receiving elements;

image forming means for, in synchronization with changes of said position, receiving signals representing light which one of said light receiving elements has received sequentially from the sample points and for producing, from said signals, image signals including pixel data representing said light which one of said light receiving elements has received sequentially from the sample points; and control means for apparently moving said apertures to predetermined positions on the light receiving surfaces of said light receiving elements, and for arranging, adjacent to each other, the pixel data representing the light which has passed through different apertures.

According to another preferred embodiment of the present invention, there is provided an image pickup apparatus comprising:

a light receiving section having a plurality of groups each consisting of apertures located in different positions and light receiving elements forming a set;

displacing means for changing a positional relationship between each of said light receiving elements and a light beam which enters each said light receiving element, an exposure of light to said light receiving section being performed a number of times, the number of light beams which enter each said light receiving elements being one per exposure, and said displacing means changing said positional relationship each time the exposure is performed;

storing means for receiving output signals representing the light beams which have entered each said light receiving element at times of the exposure and for storing said output signals in association with timings of the exposure; and control means for producing image data from output signals stored in said storing means.

According to another preferred embodiment of the present invention, there is provided an image pickup apparatus comprising:

an image pickup section having a plurality of groups each consisting of image pickup elements including light detecting portions, located in different positions, for detecting intensities of light beams entering said light detecting portions;

shift means for changing a positional relationship between each of said light detecting portions and a light beam which enters each said light detecting portion, a detection of light being performed a number of times by each said light detecting portion, the number of light beams detected by each said light detecting portion being one per detection, and said shift means changing said positional relationship each time the detection is performed;

control means for producing image data from output signals representing the light beams detected by each said light detecting portion; and storing means for storing the image data produced by said control means.

According to the above-described structure, any light receiving element of the light receiving section sequentially detects light representing sample points of the image of the object to be photographed, and a plurality of image signals are produced. This improves the resolution without having to change the integration density. The light receiving section includes sets of light receiving elements, and apertures are orthographically projected in different positions on the light receiving surfaces of the light receiving elements of each set. The apertures are apparently moved to predetermined positions on the light receiving surfaces. The pixel data as produced are arranged so that pixel data representing the intensity of light which has passed through different apertures are adjacent to each other. Therefore, with the final pixel arrangement attained by the aforementioned processing (interpolation) of arranging the pixel data, the resolution when a group of adjacent pixel data corresponding to the same color is regarded as a single pixel data item is improved (in other words, the final pixel arrangement is finer than that of the conventional case). The arrangement of the pixel data in the final pixel arrangement data after the interpolation is the same as that of the light receiving elements before the interpolation. Accordingly, the data precision of the luminance signal and the color difference signals is high. Moreover, the horizontal and vertical resolutions are improved. Under the above-described conditions, the performance of the image pickup apparatus is considerably improved.

BRIEF DESCRIPTION OF THE DRAWINGS

FIGS. 1A to 1D show the process of forming conventional final pixel arrangement data;

FIGS. 7A to 7E show the process of forming final pixel arrangement data according to the first embodiment of the present invention;

FIGS. 8A to 8E show the process of forming final pixel arrangement data according to the second embodiment of the resent invention;

DESCRIPTION OF THE PREFERRED EMBODIMENTS

First Embodiment

The image pickup apparatus according to the first embodiment of the present invention will now be described with reference to FIGS. 2 to 7.

Figure 2:
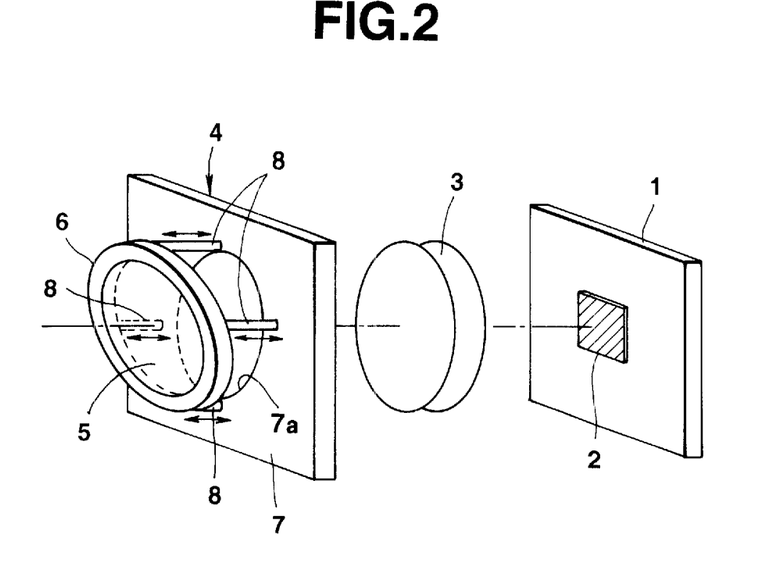
FIG. 2 is a diagram showing the structure of an image pickup apparatus according to the first embodiment of the present invention.

FIG. 2 is a diagram showing the structure of the image pickup apparatus. In FIG. 2, a light receiving section 2 is provided on the light incident surface of a light receiving substrate 1. The light receiving section 2 has a photosensitive portion, an electric charge transfer portion and a large number of light receiving elements formed in a matrix pattern. A lens 3 is arranged in front of (on the light incident side of) the light receiving section 2. A position changing mechanism (position changing means) 4 is arranged in front of (on the light incident side of) the lens 3. The position changing mechanism 4 changes the positions in which sample points of the image of the object to be photographed are projected. The position changing mechanism 4 has a transparent, disk-shaped flat plate 5 whose major surfaces are parallel with each other, a hold ring 6, a support plate 7 and piezoelectric elements 8. The flat plate 5 is fitted in the hold ring 6. A circular hole 7a is formed in that part of the support plate 7 which the light passing through the flat plate 5 is to enter. The piezoelectric elements 8 are provided between the support plate 7 and the, hold ring 6, and three-dimensionally tilt the flat plate 5 with respect to an optical axis O. When the contraction of the piezoelectric elements 8 is electrically controlled, the tilt angle and tilt direction of the flat plate 5 with respect to the optical axis O are changed.

When picking up the image of the object to be photographed, the image pickup apparatus electrically controls the contraction of the piezoelectric elements 8, thereby changing the tilt angle and tilt direction of the flat plate 5 with respect to the optical axis O. Light coming from individual sample points on the object to be photographed shifts in accordance with the tilt angle and tilt direction of the flat plate 5 with respect to the optical axis O, and enters the light receiving elements of the light receiving section 2 through the lens 3. In that case, each light receiving element sequentially detects light beams representing adjacent sample points. Signals representing the detected sample points are output in synchronization with the changes of the positions in which the sample points are projected. Consequently, a plurality of image signals are produced.

Figure 3A:
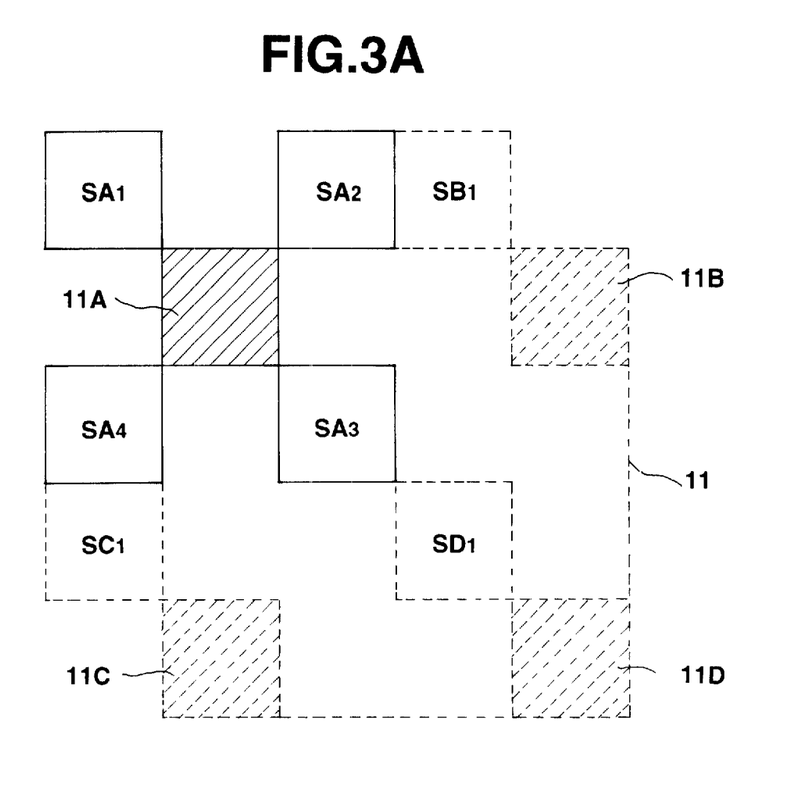
FIG. 3A is a diagram showing the correspondence of four apertures of the light receiving section illustrated in FIG. 2 to sample points.
Figure 3B:
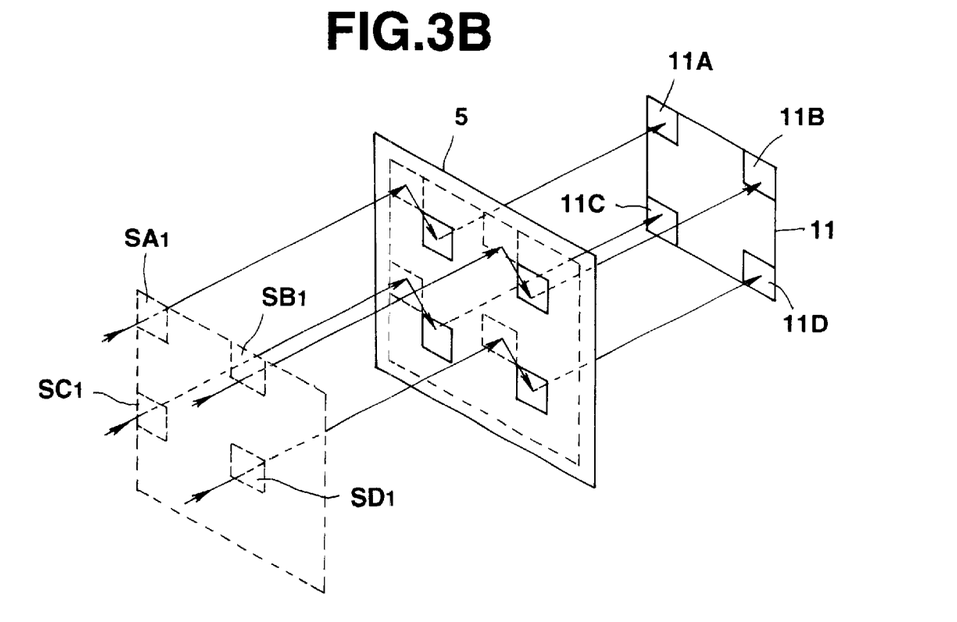
FIG. 3B is a diagram showing the path of a light beam from sample points when the light beam refracts obliquely downward to the right with respect to the traveling direction of the light beam.
Figure 3C:
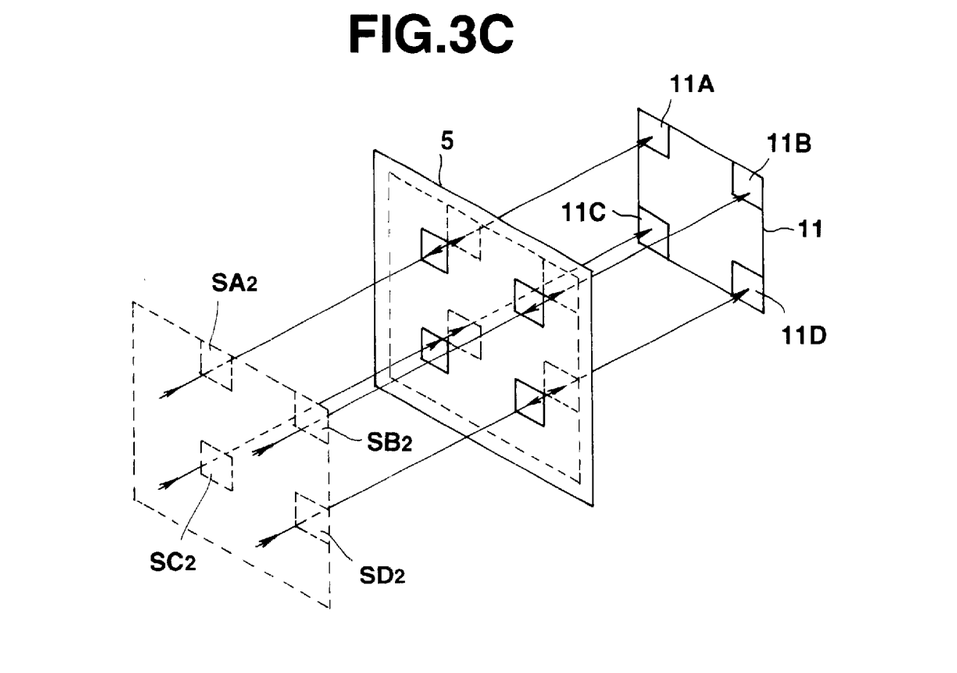
FIG. 3C is a diagram showing the path of a light beam from sample points when the light beam refracts obliquely downward to the left with respect to the traveling direction of the light beam.
Figure 3D:
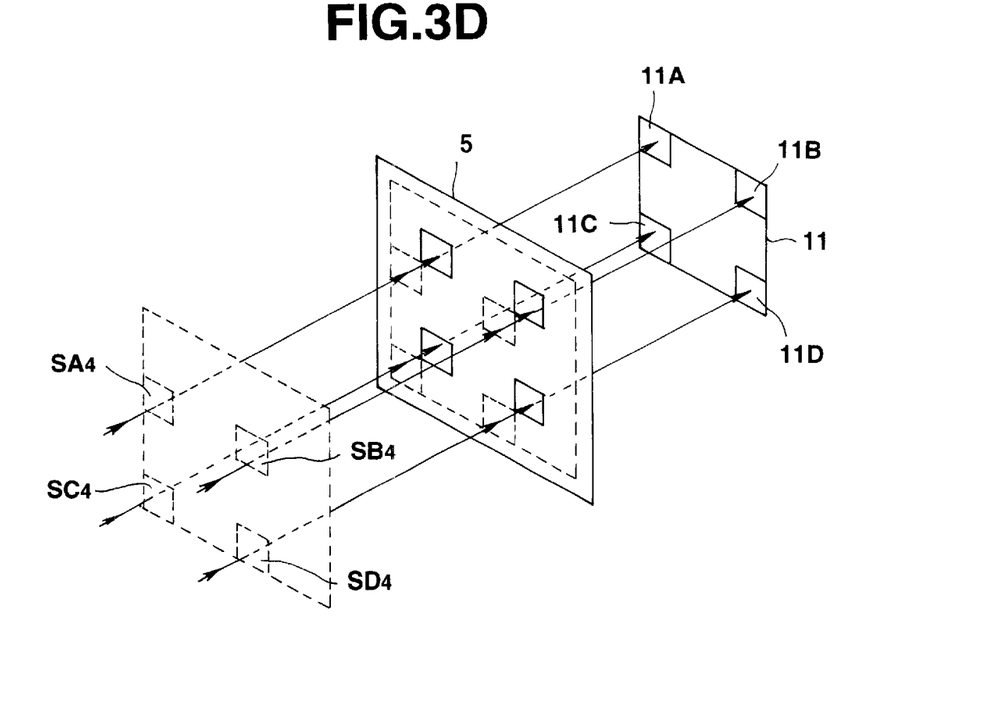
FIG. 3D is a diagram showing the path of a light beam from sample points when the light beam refracts obliquely upward to the right with respect to the traveling direction of the light beam.
Figure 3E:
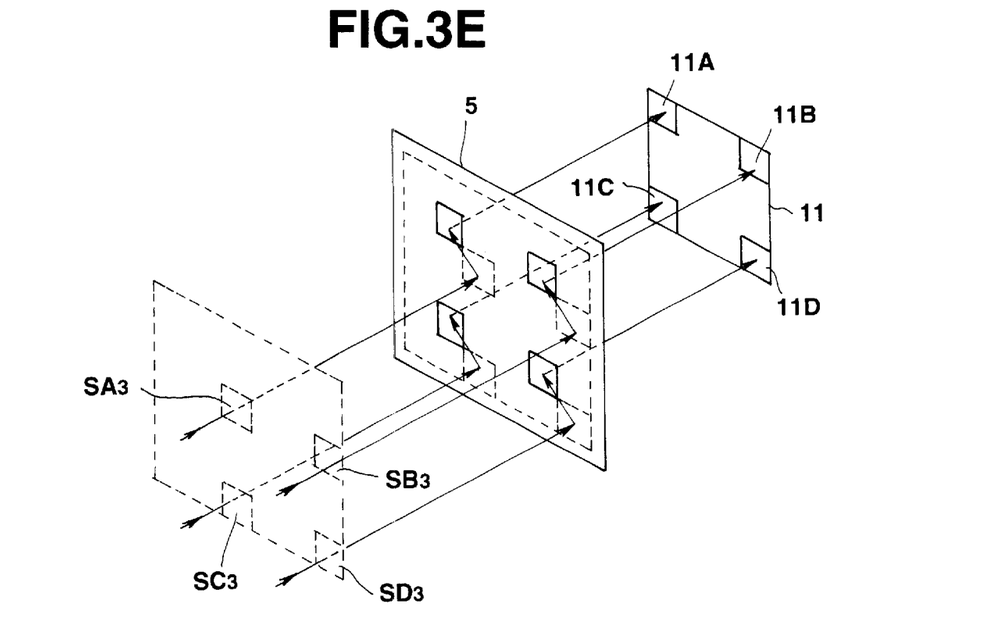
FIG. 3E is a diagram showing the path of a light beam from sample points when the light beam refracts obliquely upward to the left with respect to the traveling direction of the light beam.

According to the above-described image pickup apparatus, four light projection positions SA1, SA2, SA3 and SA4 shown in FIG. 3A and which four light beams reflected from sample points would reach if they were not refracted are moved upward, to the left, or obliquely upward to the left through a distance equal to the length/width of 1 light receiving element in accordance with changes in the tilt angle and tilt direction of the flat plate 5 with respect to the optical axis O, as shown in FIGS. 3B to 3E. In FIGS. 3B to 3E, corresponding references are given to sample points which would project light beams on projection points SA1 to SA4, SB1 to SB4, SC1 to SC4, and SD1 to SD4, if light beams from sample points were not refracted. In consequence, the light beams which would reach the light projection positions SA1, SA2, SA3 and SA4 if they were not refracted, pass through the aperture 11A shown in FIG. 3A, for example, and are detected by one of the light receiving elements which is located behind the aperture.

Pixel data A1, A2, A3 and A4 shown in FIGS. 7A to 7E and FIGS. 8A to 8E represent, in one-to-one correspondence, the four light beams reflected from sample points and which would reach the projection positions SA1, SA2, SA3 and SA4 if they were not refracted.

Pixel data B1 represents a light beam which would, if not refracted, reach a light projection position SB1 located diagonally above the upper left-hand corner of the aperture 11B. Pixel data B2 represents a light beam which would, if not refracted, reach a light projection position located diagonally above the upper right-hand corner of the aperture 11B. Pixel data B3 represents a light beam which would, if not refracted, reach a light projection position located obliquely below the lower right-hand corner of the aperture 11B. Pixel data B4 represents a light beam which would, if not refracted, reach a light projection position located obliquely below the lower left-hand corner of the aperture 11B.

Pixel data C1 represents a light beam which would, if not refracted, reach a light projection position SC1 located diagonally above the upper left-hand corner of the aperture 11C. Pixel data. C2 represents a light beam which would, if not refracted, reach a light projection position located diagonally above the upper right-hand corner of the aperture 11C. Pixel data C3 represents a light beam which would, if not refracted, reach a light projection position located obliquely below the lower right-hand corner of the aperture 11C. Pixel data C4 represents a light beam which would, if not refracted, reach a light projection position located obliquely below the lower left-hand corner of the aperture 11C.

Pixel data D1 represents a light beam which would, if not refracted, reach a light projection position SD1 located diagonally above the upper left-hand corner of the aperture 11D. Pixel data D2 represents a light beam which would, if not refracted, reach a light projection position located diagonally above the upper right-hand corner of the aperture 11D. Pixel data D3 represents a light beam which would, if not refracted, reach a light projection position located obliquely below the lower right-hand corner of the aperture 11D. Pixel data D4 represents a light beam which would, if not refracted, reach a light projection position located obliquely below the lower left-hand corner of the aperture 11D.

Figure 4:
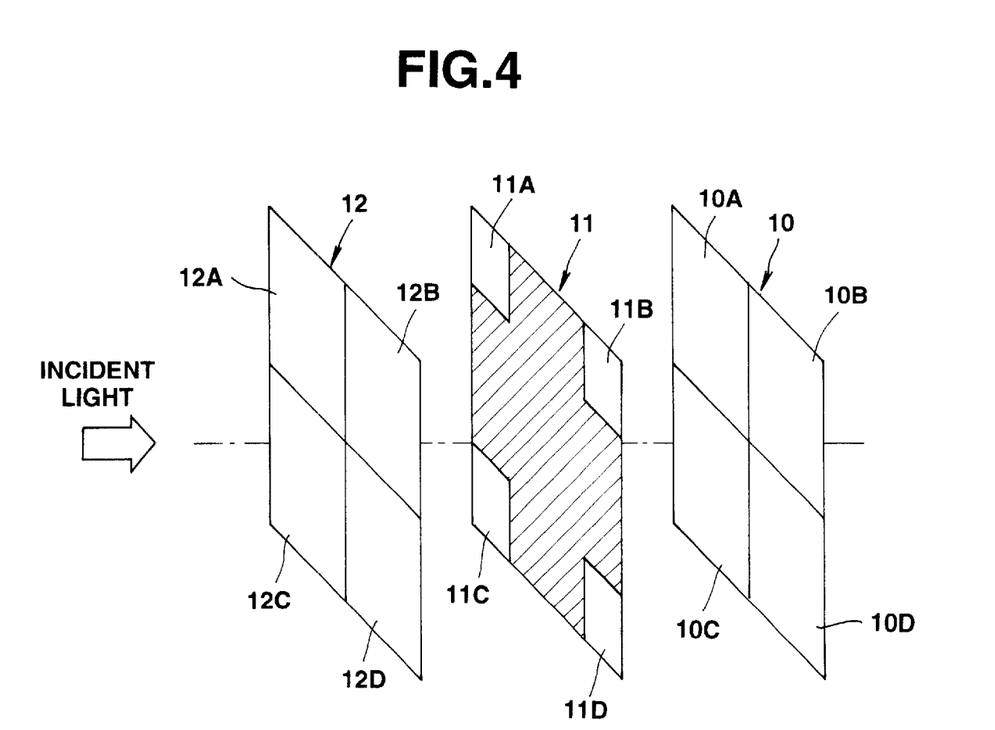
FIG. 4 is an exploded perspective view showing, on an enlarged scale, the main part of the light receiving section illustrated in FIG. 2.

The light receiving section 2 has a large number of groups each of which consists of a light receiving element set 10, a black mask 11 and a color filter 12. The light receiving element set 10 is formed of four light receiving elements 10A to 10D. As shown in FIG. 4, the light receiving elements 10A to 10D are arranged in 2×2 matrix pattern. The black mask 11 is arranged on the light incident side of the light receiving element set 10. The black mask11 is provided with apertures A to D. The light passing through the apertures A to D perpendicularly thereto enters the light receiving elements 10A to 10D. The color filter 12 is arranged on the light incident side of the black mask 11. The color filter 12 has color filter portions 12A to 12D for different colors. The light passing through the filter portions 12A to 12D perpendicularly thereto enters the light receiving elements 10A to 10D.

The area of the apertures A to D is approximately ¼ that of the light receiving elements 10A to 10D. Hence, when the sample points are moved N times (e.g. four times) on the light receiving elements 10A to 10D, the aperture ratio Q of the apertures A to D is given as:

$$Q=(1/N)\times 100\%=(1/4)\times 100\%=25\%$$

Figure 7A:
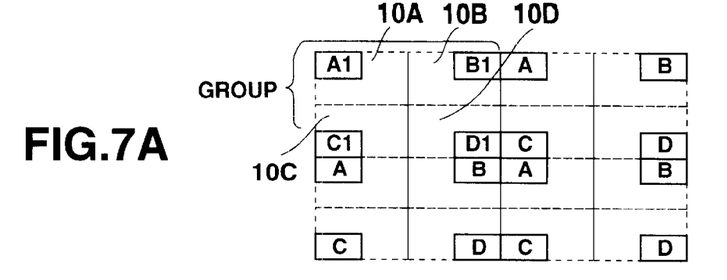
FIG. 7A is a diagram showing the positional relationship between apertures arranged in front of four light receiving elements forming a set.

In order to make the intervals between the apertures A to D maximum, the apertures A to D are arranged on the light incident side of the light receiving elements 10A to 10D so as to be located in front of the corner portions of the light receiving elements 10A to 10D, not in front of the central portions of the light receiving elements 10A to 10D. For example, as shown in FIG. 7A, the aperture A is located in front of the upper left-hand corner portion of the light receiving element 10A. The aperture B is located in front of the upper right-hand corner portion of the light receiving element 10B. The aperture C is located in front of the lower left hand corner portion of the light receiving element 10C. The aperture D is located in front of the lower right-hand corner portion of the light receiving element 10D. Accordingly, the apertures A and B are laterally separated from each other at 1.5 element pitch, and the aperture A included in another group is located adjacent to and on the right-hand side of the aperture B. The apertures C and D are laterally separated from each other at 1.5 element pitch, and the aperture C included in another group is located adjacent to and on the right-hand side of the aperture D. The apertures A and C are vertically separated from each other at 1.5 element pitch, and the aperture A included in another group is located adjacent to and under the aperture C. The apertures B and D are vertically separated from each other at 1.5 element pitch, and the aperture B included in another group is located adjacent to and under the aperture D.

Figure 5:
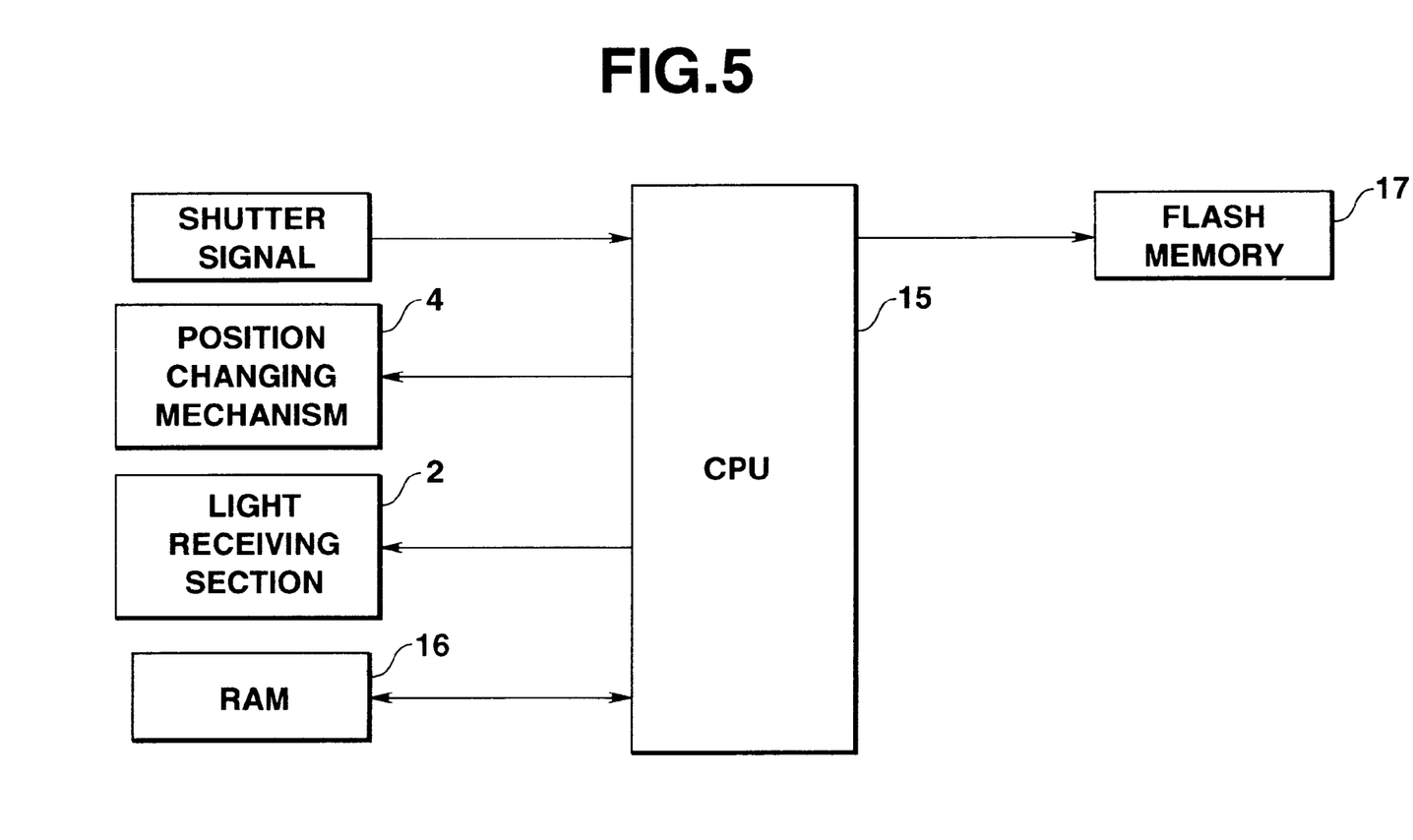
FIG. 5 is a block diagram showing the structure of the image pickup apparatus illustrated in FIG. 2.
Figure 6:
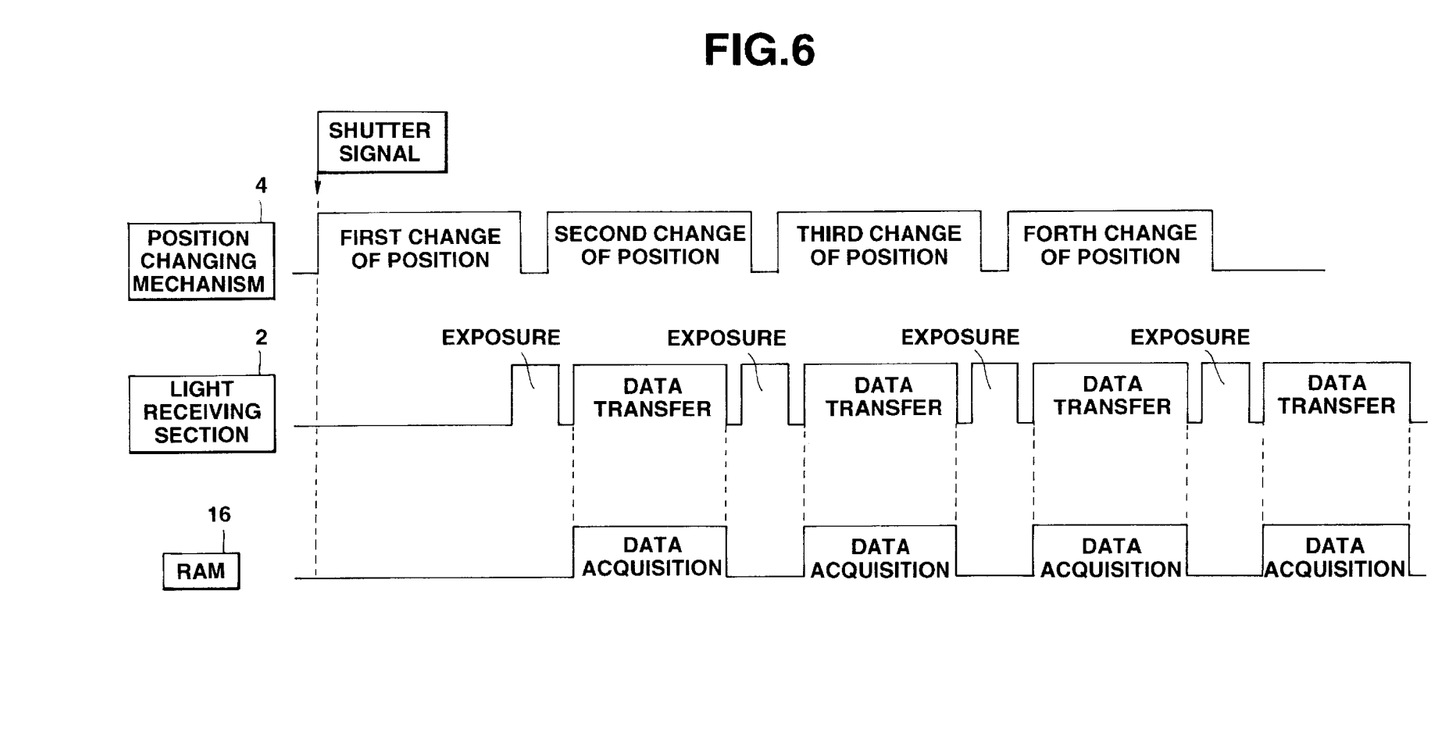
FIG. 6 is a diagram showing the timing at which the image pickup apparatus illustrated in FIG. 2 performs a photographing action.

As shown in FIG. 5, the image pickup apparatus includes a CPU (Central Processing Unit) 15. When a release button is depressed, a shutter signal is supplied to the CPU 15. Upon receiving the shutter signal, the CPU 15 controls the entire circuitry so that photography is performed once. While a photograph is being taken, exposure is successively performed four times. More specifically, if the shutter signal is supplied to the CPU 15, the CPU 15 outputs a drive signal to the position changing mechanism 4 each time the exposure is performed, as shown in FIG. 6. In response to the drive signal, the piezoelectric elements 8 of the position changing mechanism 4 are driven, and tilt the flat plate 5 with respect to the optical axis O in a predetermined direction. Thus, the positions in which the light beams representing the sample points SA to SD are projected are sequentially designated, and the light beams representing the four sample points SA to SD, which are adjacent to each other, are sequentially projected on each of the light receiving elements 10A to 10D.

In each of the periods during which the positions in which the light beams representing the sample points SA to SD are projected are designated, the CPU 15 supplies a photo signal to the light receiving section 2 so that the exposure is performed. In each of the periods during which the positions in which the light beams representing the sample points SA to SD are projected are changed, the CPU 15 supplies a transfer signal to the light receiving section 2, and no exposure is performed. The detection signals (output signals) generated by the light receiving elements 10A to 10D are transferred in sequence to a RAM 16 as pixel data, and are stored therein. Pixel data stored in the RAM 16 are read out as four image data items (image signals) generated one per exposure. The image data items are subjected to the interpolation, whereby they are combined into one image data item (final pixel arrangement data). The final pixel arrangement data is stored in a flash memory 17.

In the above-described image pickup apparatus, each of the light receiving elements 10A to 10D included in each group detects light beams representing sample points. The pixel data obtained as a result of the detection are subjected to the interpolation, thereby producing the final pixel arrangement data.

FIGS. 7A to 7E show the process of the interpolation.

At the time of the first exposure, as shown in FIG. 7A, light beams reflected from any sample points and which would reach the light projection positions SA1, SB1, SC1 and SD1 if they were not refracted, pass apertures 11A to 11D shown in FIG. 3, respectively. The light receiving elements 10A to 10D, which are located behind the apertures 11A to 11D, respectively, receive those light beams and generate the pixel data A1, B1, C1 and D1, respectively.

Figure 7B:
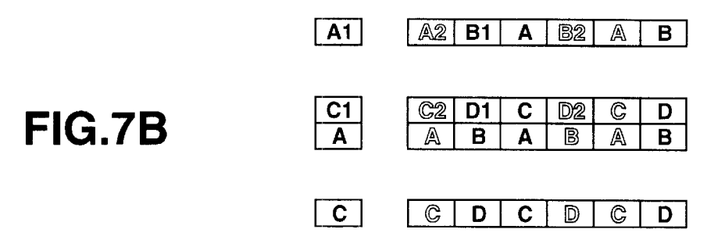
FIG. 7B is a diagram showing the positional relationship between pixel data obtained by the first and second exposures.

At the time of the second exposure, as shown in FIG. 7B, light beams reflected from any sample points and which would, if not refracted, reach the light projection positions located diagonally above the upper right-hand corners of the apertures 11A to 11D, pass through apertures 11A to 11D shown in FIG. 3. The light receiving elements 10A to 10D located behind the apertures 11A to 11D receive those light beams and generate the pixel data A2, B2, C2 and D2.

Figure 7C:
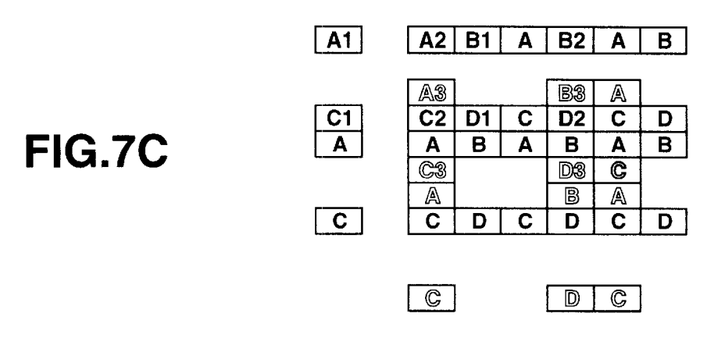
FIG. 7C is a diagram showing the positional relationship between pixel data obtained by the first, second and third exposures.

At the time of the third exposure, as shown in FIG. 7C, light beams reflected from any sample points and which would, if not refracted, reach the light projection positions located diagonally below the lower right-hand corners of the apertures 11A to 11D, pass through apertures 11A to 11D shown in FIG. 3. The light receiving elements 10A to 10D located behind the apertures 11A to 11D receive those light beams and generate the pixel data A3, B3, C3 and D3.

Figure 7D:
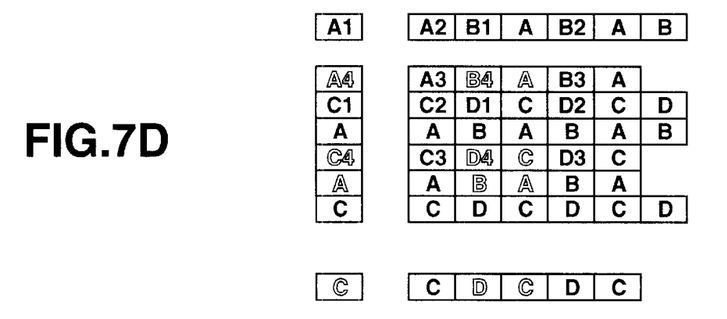
FIG. 7D is a diagram showing the positional relationship between pixel data obtained by the first to fourth exposure.

At the time of the fourth exposure, as shown in FIG. 7D, light beams reflected from any sample points and which would, if not refracted, reach the light projection positions located diagonally below the lower left-hand corners of the apertures 11A to 11D, pass through apertures 11A to 11D shown in FIG. 3. The light receiving elements 10A to 10D located behind the apertures 11A to 11D receive those light beams and generate the pixel data A4, B4, C4 and D4.

Figure 7E:
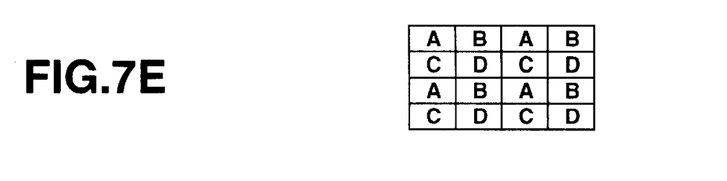
FIG. 7E is a diagram showing the basic arrangement of the pixel data in the final pixel arrangement data.

Of the final pixel arrangement data thus obtained, the pixel data representing the light which has passed through the same aperture are not adjacent to each other in the vertical or lateral direction, as shown in FIG. 7E. As a result of the interpolation, the pixel data representing the light which has passed through the apertures A to D are arranged in the same order as the light receiving elements 10A to 10D. The pixel data are arranged at 0.5 element pitch. By processing the final pixel arrangement data thus arranged, the luminance signal Y and the color difference signals R−Y and B−Y are attained. The signals Y, R−Y and B−Y are reproduced as the final pixel arrangement data having the pixel arrangement shown in FIG. 7E.

According to the above image pickup apparatus, as mentioned previously, the light beams coming from the object to be photographed and representing four sample points SA, SB, SC and SD are sequentially detected by one light receiving element, and a plurality of image signals are generated. The light receiving section 2 has a plurality of groups each of which consists of four light receiving elements 10A to 10D forming a set and apertures A to D located in front of the corner portions of the light receiving elements 10A to 10D. Apparently, the apertures A to D are moved 1 element pitch to the right, and then are moved 1 element pitch downward, and are further moved 1 element pitch to the left. By so doing, the resolution is improved without having to change the integration density. Moreover, in the final pixel arrangement data, as shown in FIG. 7E, the pixel data representing the light which has passed through the same aperture are not adjacent to each other in the vertical or lateral direction. Unlike in the conventional case, the pixel data representing the light which has passed through the same aperture do not form a group. Hence, it does not occur that a group of such pixel data represents substantially 1 pixel in the final pixel arrangement obtained by the interpolation. In short, the final pixel arrangement is finer than that of the conventional case. Accordingly, the data precision of the luminance signal and the color difference signals is high.

In particular, according to the above image pickup apparatus, the apertures A to D are arranged in front of the corner portions of the light receiving elements 10A to 10D so that the intervals between the apertures A to D are maximum. By performing simple interpolation processing by which the apertures 11A to 11D are moved a number of times through 1 element pitch per movement, the final pixel arrangement data is attained. The arrangement of the pixel data in the final pixel arrangement data is the same as that of the apertures 11A to 11D. This permits a signal processing algorithm to be shared. Further, the horizontal and vertical resolutions are two times as high as those in the case where the interpolation processing is not performed. Under the above-described conditions, the performance of the image pickup apparatus is considerably improved.

Second Embodiment

An image pickup apparatus according to the second embodiment of the present invention will now be described with reference to FIGS. 8A to 8E. Parts similar to those of the first embodiment illustrated in FIGS. 2 to 7 will be denoted by their corresponding reference characters used in FIGS. 2 to 7, and explanations thereof will not be made.

This image pickup apparatus is the same as that of the first embodiment in other points than the positional relationship between each of the light receiving elements 10A to 10D and its corresponding one of four apertures and the way of performing the interpolation. The apertures are arranged alternately in front of different corner portions of the light receiving elements 10A to 10D.

More precisely, the first aperture is arranged in front of the upper left-hand corner portion of the light receiving element 10A. The second aperture is arranged in front of the lower left-hand corner portion of the light receiving element 10B. The third aperture is arranged in front of the upper right-hand corner portion of the light receiving element 10C. The aperture D is arranged in front of the lower right-hand corner portion of the light receiving element 10D. Accordingly, the first and second apertures are separated at 1 element pitch laterally and at 0.5 element pitch vertically from each other, as are the third and fourth apertures. The first and third apertures are separated at 0.5 element pitch laterally and at 1 element pitch vertically from each other, as are the second and fourth apertures. The aperture ratio Q of each of the apertures A to D is 25% (=(1 / N)×100%), as well as in the case of the first embodiment.

The pixel data detected by the light receiving elements 10A to 10D thus arranged are also subjected to the interpolation, thereby producing the final pixel arrangement data.

FIGS. 8A to 8E show the process of the interpolation according to this embodiment. The interpolation process of this embodiment is the same as that of the first embodiment which is shown in FIGS. 7A to 7E.

Figure 8A:
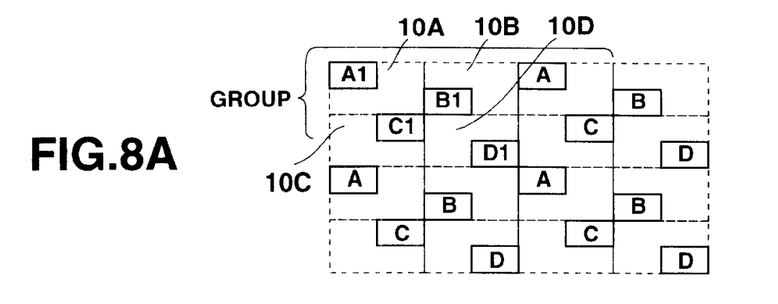
FIG. 8A is a diagram showing the positional relationship between apertures arranged in front of four light receiving elements forming a set.

At the time of the first exposure, as shown in FIG. 8A, light beams reflected from any sample points and which would reach the light projection positions SA1, SB1, SC1 and SD1 if they were not refracted, pass the first to fourth apertures, respectively. The light receiving elements 10A to 10D, which are located behind the first to fourth apertures, respectively, receive those light beams and generate the pixel data A1, B1, C1 and D1, respectively.

Figure 8B:
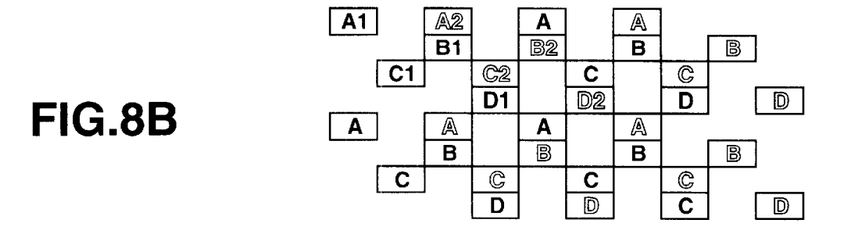
FIG. 8B is a diagram showing the positional relationship between pixel data obtained by the first and second exposures.

At the time of the second exposure, as shown in FIG. 8B, light beams reflected from any sample points and which would, if not refracted, reach the light projection positions located diagonally above the upper right-hand corners of the first to fourth apertures, pass through the first to fourth apertures. The light receiving elements 10A to 10D located behind the first to fourth apertures receive those light beams and generate the pixel data A2, B2, C2 and D2.

Figure 8C:
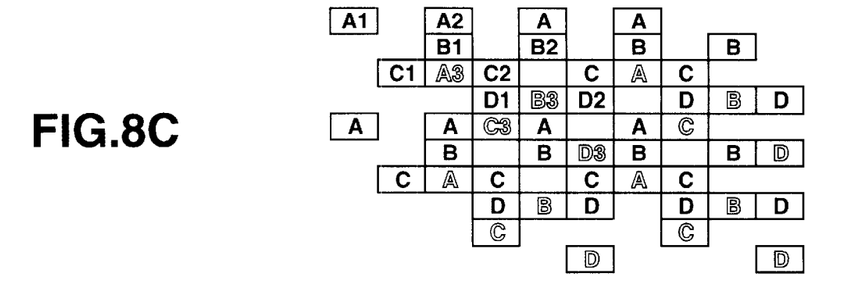
FIG. 8C is a diagram showing the positional relationship between pixel data obtained by the first, second and third exposures.

At the time of the third exposure, as shown in FIG. 8C, light beams reflected from any sample points and which would, if not refracted, reach the light projection positions located diagonally below the lower right-hand corners of the first to fourth apertures 11A to 11D, pass through the first to fourth apertures. The light receiving elements 10A to 10D located behind the first to fourth apertures receive those light beams and generate the pixel data A3, B3, C3 and D3.

Figure 8D:
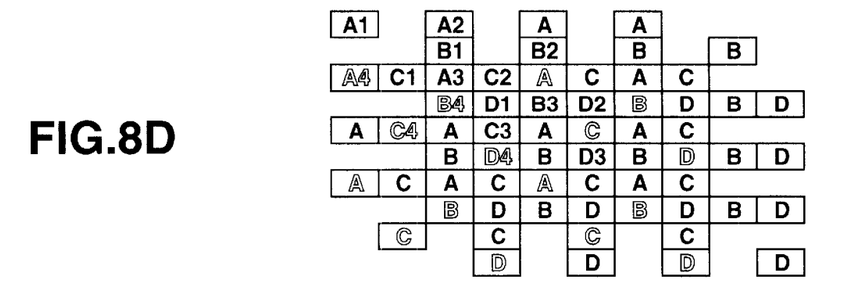
FIG. 8D is a diagram showing the positional relationship between the first to fourth exposures.

At the time of the fourth exposure, as shown in FIG. 8D, light beams reflected from any sample points and which would, if not refracted, reach the light projection positions located diagonally below the lower left-hand corners of the first to fourth apertures, pass through the first to fourth apertures. The light receiving elements 10A to 10D located behind the first to fourth apertures receive those light beams and generate the pixel data A4, B4, C4 and D4.

Figure 8E:
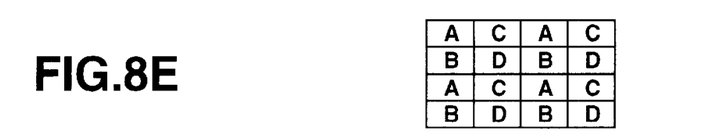
FIG. 8E is a diagram showing the basic arrangement of the pixel data in the final pixel arrangement data.

Of the final pixel arrangement data thus obtained, the pixel data representing the light which has passed through the same aperture are not adjacent to each other in the vertical or lateral direction, as shown in FIG. 8E. In the interpolation, the pixel data representing the light which has passed through the apertures A to D are arranged at 0.5 element pitch and in the same order as the light receiving elements 10A to 10D. By processing the final pixel arrangement data thus arranged, the luminance signal Y and the color difference signals R-Y and B-Y are attained, as in the case of the first embodiment. The signals Y, R-Y and B-Y are reproduced as the final pixel arrangement data having the pixel arrangement shown in FIG. 8E.

Thus, according to the above image pickup apparatus, light beams reflected from the object to be photographed and representing four sample points are sequentially detected by each light receiving element, and a plurality of image signals are generated. The light receiving section 2 has a plurality of groups each of which consists of four light receiving elements 10A to 10D and apertures A to D located in front of different corner portions of the light receiving elements 10A to 10D. Apparently, the apertures A to D are moved 1 element pitch to the right, and then are moved 1 element pitch downward, and are further moved 1 element pitch to the left. By so doing, the resolution is improved without having to change the integration density. Moreover, in the final pixel arrangement data, as shown in FIG. 8E, the pixel data representing the light which has passed through the same aperture are not adjacent to each other in the vertical or lateral direction. As in the case of the first embodiment, the pixel data representing the light which has passed through the same aperture do not form a group. Hence, it does not occur that a group of such pixel data represents substantially 1 pixel in the final pixel arrangement obtained by the interpolation (in short, the final pixel arrangement is finer than that of the conventional case). Accordingly, the data precision of the luminance signal and the color difference signals is high.

In particular, according to the above image pickup apparatus, the apertures are arranged alternately in front of the corner portions of the light receiving elements 10A to 10D, as shown in FIG. 8A. The arrangement of the apertures is the same as that of the pixel data A1, B1, C1 and D1 shown in FIG. 8A. By performing the simple interpolation processing by which the apertures are apparently moved a number of times through 1 element pitch per movement, the pixel data representing the light which has passed through different apertures are arranged adjacent to each other. The arrangement of the pixel data in the final pixel arrangement data is the same as that of the apertures. In this case, the horizontal and vertical resolutions are two times as high as those in the case where the interpolation processing is not performed. Under the above-described conditions, the performance of the image pickup apparatus is considerably improved.

In the first and second embodiments, the transparent flat plate 5 whose major surfaces are parallel with each other is employed as the position changing means for changing the positions in which the sample points of the image of the object to be photographed are projected. The flat plate 5 is three-dimensionally tilted by the piezoelectric elements 8 with respect to the optical axis O. However, means for changing the positions in which the sample points are projected is not limited thereto. For example, the transparent flat plate can be rotated around the optical axis O in the state wherein it is tilted at a predetermined angle with respect to the optical axis 5 0. The light receiving substrate 1 of the light receiving section 2 may be laterally or vertically moved.

Furthermore, according to the first and second embodiments, light of different colors passes through four filter portions 12A to 12D. However, the light passing therethrough is not necessarily light of different colors. For example, the filter portions 12A to 12D may allow either the red light, green light or blue light to pass therethrough. Moreover, the image pickup apparatuses according to the present invention can be widely adopted as image pickup units such as video cameras and monitoring cameras for taking moving pictures. Moreover, in the first and second embodiments, a CCD is used as an image pickup element. However, a CMOS or the like can also be used as the image pickup element.

What is claimed is:

1. An image pickup apparatus comprising:

a light receiving section having a plurality of groups, each group comprising a plurality of light receiving elements and a plurality of apertures which are paired with the plurality of said light receiving elements respectively, and wherein the apertures are arranged such that centers thereof do not coincide with centers of the respective paired light receiving elements, the apertures included in each said group being arranged in front of corner portions of said light receiving elements such that the apertures are separated from each other;

sample position changing means for changing positions of a plurality of sample points to make one of the light receiving elements in said light receiving section sequentially detect light from the plurality of sample points, in a case where said light receiving section detects light from multiple sample points of an image to be picked up;

image forming means for performing interpolation with synchronizing output signals of the plurality of said sample points sequentially detected by one of said light receiving elements in said light receiving section with position transfer given by said sample point changing means, to form an image signal; and control means for controlling the interpolation during forming of the image signal so that pixel data segments from different light receiving elements are adjacent to each other.

2. The image pickup apparatus according to claim 1, wherein said light receiving elements detect light of different colors, said sample position changing means causes light beams to enter said apertures at different timings, said image forming means generates image signals including pixel data representing light beams of different colors entering said light receiving elements at a same timing through said apertures and detected by said light receiving elements, and said control means arranges, adjacent to each other, the pixel data representing the light beams of different colors.

3. The image pickup apparatus according to claim 1, wherein the light receiving elements included in each of said plurality of groups are four light receiving elements arranged in a matrix pattern.

4. An image pickup apparatus comprising:

a light receiving section having a plurality of groups, each group comprising a plurality of light receiving elements and a plurality of apertures which are paired with the plurality of said light receiving elements respectively, and wherein the apertures are arranged such that centers thereof do not coincide with centers of the respective paired light receiving elements, the light receiving elements included in each of said plurality of groups being arranged in a matrix pattern, and the apertures included in each said group being arranged alternately in front of different corner portions of said light receiving elements;

sample position changing means for changing positions of a plurality of sample points to make one of the light receiving elements in said light receiving section sequentially detect light from the plurality of sample points, in a case where said light receiving section detects light from multiple sample points of an image to be picked up;

image forming means for performing interpolation with synchronizing output signals of the plurality of sample points sequentially detected by one of said light receiving elements in said light receiving section with position transfer given by said sample point changing means, to form an image signal; and control means for controlling the interpolation during formation of the image signal so that pixel data segments from different light receiving elements are adjacent to each other.

5. The image pickup apparatus according to claim 1, wherein said sample position changing means is located closer to the object to be photographed than said light receiving section, and causes a light beam entering said sample position changing means along a first optical path to come out therefrom and enter said light receiving elements along a second optical path parallel to said first optical path.

6. The image pickup apparatus according to claim 5, wherein said sample position changing means includes a substantially transparent plate, and refracts, in accordance with a tilt angle of said plate, a light beam entering said plate along said first optical path, thereby causing the light beam to come out from said plate along said second optical path parallel to said first optical path.

7. The image pickup apparatus according to claim 1, wherein said sample position changing means includes moving means for moving said light receiving section so that a light receiving surface of said light receiving section substantially moves in one plane.

8. The image pickup apparatus according to claim 7, wherein said moving means comprises means for moving said light receiving section in two different directions and substantially in parallel with the light receiving surface of said light receiving section.

9. An image pickup apparatus comprising:

a light receiving section which includes a plurality of groups, each group comprising a plurality of light receiving elements and a plurality of apertures which are paired with the plurality of said light receiving elements respectively, and wherein the apertures are arranged such that centers thereof do not coincide with centers of the respective pairs of light receiving elements, the light receiving elements included in each of said plurality of groups being arranged in a matrix pattern, and the apertures included in each said group being arranged in front of corner portions of said light receiving elements so that said apertures are separated away from each other;

displacing means for changing a positional relationship between each of said light receiving elements and incident light so that each receiving element receives a different flux each time said light receiving element is exposed, in a case where said light receiving section is exposed plural times;

storing means for storing output signals of said light receiving section representing lights received at the plural exposures, while being synchronous with the plural exposures; and control means for producing image data from output signals stored in said storing means.

10. The image pickup apparatus according to claim 9, wherein said control means produces the image data by arranging said output signals so that ones of said output signals which have been received from a same light receiving element are not adjacent to each other.

11. The image pickup apparatus according to claim 9, wherein said light receiving elements detect intensities of different colors of light as pixel data, said displacing means causes light beams to sequentially enter said apertures at different timings, the pixel data representing intensities of light beams entering said light receiving elements at a same timing through said apertures and detected by said light receiving elements are stored in association with each other in said storing means, and said control means arranges, adjacent to each other, the pixel data representing the intensities of different colors of light.

12. The image pickup apparatus according to claim 11, wherein said displacing means includes moving means for moving said light receiving section in two different directions so that a light receiving surface of said light receiving section substantially moves in one plane.

13. The image pickup apparatus according to claim 12 wherein said moving means comprises means for moving said light receiving section in two different directions and substantially in parallel with the light receiving surface of said light receiving section.

14. The image pickup apparatus according to claim 9, wherein said displacing means is located closer to an object to be photographed than said light receiving section, and causes a light beam entering said displacing means along a first optical path to come out therefrom and enter said light receiving elements along a second optical path parallel to said first optical path.

15. The image pickup apparatus according to claim 14, wherein said displacing means includes a substantially transparent plate, and refracts, in accordance with a tilt angle of said plate, a light beam entering said plate along said first optical path, thereby causing the light beam to come out from said plate along said second optical path parallel to said first optical path.

16. An image pickup apparatus comprising:

a light receiving section which includes a plurality of groups, each group comprising a plurality of light receiving elements and a plurality of apertures which are paired with the plurality of said light receiving elements respectively, and wherein the apertures are arranged such that centers thereof do not coincide with centers of the respective pairs of light receiving elements, the light receiving elements included in each of said plurality of groups being arranged in a matrix pattern, and the apertures included in each said group being arranged alternately in front of different corner portions of said light receiving elements;

displacing means for changing a positional relationship between each of said light receiving elements and incident light so that each receiving element receives different flux each time said light receiving element is exposed, in a case where said light receiving section is exposed plural times;

storing means for storing output signals of said light receiving section representing lights received at the plural exposures, while being synchronous with the plural exposures; and control means for producing image data from output signals stored in said storing means.

17. An image pickup apparatus comprising:

a light receiving section having a plurality of groups, each group comprising a plurality of light receiving elements and a plurality of apertures which are paired with the plurality of said light receiving elements respectively, and wherein the apertures are arranged such that centers thereof do not coincide with centers of the respective paired light receiving elements, the light receiving elements included in each of said plurality of groups being four light receiving elements arranged in a matrix pattern, and the apertures included in each said group being arranged in front of corner portions of said light receiving elements so that said apertures are separated away from each other;

sample position changing means for changing positions of a plurality of sample points to make one of the light receiving elements in said light receiving section sequentially detect light from the plurality of sample points, in a case where said light receiving section detects light from multiple sample points of an image to be picked up;

image forming means for performing interpolation with synchronizing output signals of the plurality of said sample points sequentially detected by one of said light receiving elements in said light receiving section with position transfer given by said sample point changing means, to form an image signal; and control means for controlling the interpolation during formation of the image signal so that pixel data segments from different light receiving elements are adjacent each other.

18. An image pickup apparatus comprising:

a light receiving section having a plurality of groups, each group comprising a plurality of light receiving elements and a plurality of apertures which are paired with the plurality of said light receiving elements respectively, and wherein the apertures are arranged such that centers thereof do not coincide with centers of the respective paired light receiving elements, the light receiving elements included in each of said plurality of groups being four light receiving elements arranged in a matrix pattern, and the apertures included in each said group being arranged alternately in front of different corner portions of said light receiving elements;

sample position changing means for changing positions of a plurality of sample points to make one of the light receiving elements in said light receiving section sequentially detect light from the plurality of sample points, in a case where said light receiving section detects light from multiple sample points of an image to be picked up;

image forming means for performing interpolation with synchronizing output signals of the plurality of said sample points sequentially detected by one of said light receiving elements in said light receiving section with position transfer given by said sample point changing means, to form an image signal; and control means for controlling the interpolation during formation of the image signal so that pixel data segments from different light receiving elements are adjacent each other.

19. An image pickup apparatus comprising:

a light receiving section having a plurality of groups, each group comprising a plurality of light receiving elements and a plurality of apertures which are paired with the plurality of said light receiving elements respectively, and wherein the apertures are arranged such that centers thereof do not coincide with centers of the respective paired light receiving elements, the light receiving elements included in each of said plurality of groups being four light receiving elements arranged in a matrix pattern, and the apertures included in each said group being arranged in front of corner portions of said light receiving elements so that said apertures are separated away from each other;

displacing means for changing a positional relationship between each of said light receiving elements and incident light so that each receiving element receives different flux each time said light receiving element is exposed, in a case where said light receiving section is exposed plural times;

storing means for storing output signals of said light receiving section representing lights received at the plural exposures, while being synchronous with the plural exposures; and control means for producing image data from output signals stored in said storing means.

* * * * *

UNITED STATES PATENT AND TRADEMARK OFFICE
CERTIFICATE OF CORRECTION

PATENT NO.   : 6,400,402 B1                                                                 Page 1 of 1
DATED        : September 4, 2003
INVENTOR(S)  : Masakuni Iwanaga It is certified that error appears in the above-identified patent and that said Letters Patent is hereby corrected as shown below:

Title page,
Item [54], Title, delete "WITH APERTURES OFFSET FROM A LENTER"
Item [56], References Cited, U.S. PATENT DOCUMENTS, insert
-- 5,402,171     03/1995   Tagami et al --;
FOREIGN PATENT DOCUMENTS, insert
-- EPO  0 627 848 A1    12/1994
   DE   43 27 944 A1    03/2994
   UK   2,270,230       03/1999 --;
Insert -- OTHER DOCUMENTS
Fossum, E.R.: ACTIVE-PIXEL SENSORS CHALLENGE CCDS", Laser Focus World, 1 June 1993, pages 83-87, XP000575392, ISSN: 0740-2511, --.

Signed and Sealed this

Sixteenth Day of December, 2003

JAMES E. ROGAN
*Director of the United States Patent and Trademark Office*